United States Patent [19]

Sturgill

[11] Patent Number: 4,876,845

[45] Date of Patent: Oct. 31, 1989

[54] SELF PROPELLED MOWER AND TOWED MOWER WITH ADJUSTABLE HEIGHT CONNECTION

[75] Inventor: James D. Sturgill, St. Simons Island, Ga.

[73] Assignee: Robert M. Torras, St. Simons Island, Ga.

[21] Appl. No.: 337,188

[22] Filed: Apr. 12, 1989

[51] Int. Cl.[4] .................. A01D 34/56; A01D 34/66
[52] U.S. Cl. .......................... 56/6; 56/10.2; 56/15.7; 56/15.9; 56/DIG. 10
[58] Field of Search ............ 56/10.2, 13.5, 14.9, 56/15.7, 15.8, DIG. 10, DIG. 14, DIG. 15, 6, 7, 15.9, 15.3

[56] References Cited

U.S. PATENT DOCUMENTS

| | | | |
|---|---|---|---|
| 2,207,353 | 7/1940 | Piéha | 56/DIG. 10 X |
| 2,764,864 | 10/1956 | Kinkead | 56/DIG. 10 X |
| 3,135,079 | 6/1964 | Dunn | 56/DIG. 10 X |
| 4,161,858 | 7/1979 | Gerrits | 56/DIG. 10 X |

FOREIGN PATENT DOCUMENTS 3430125  2/1986  Fed. Rep. of Germany .... 56/DIG. 10

Primary Examiner—Stephen J. Novosad
Attorney, Agent, or Firm—Thomas & Kennedy

[57] ABSTRACT

A self-propelled powered mower (11) and a towed trailing mower (12) are connected together by an adjustable height connector assembly (13). When the powered mower begins to move through a turn, the alignment detector cylinder (60) is required to retract due to the pivoting of the draw bar (21) and its angled support arm about the vertical pivot pin (50) of the connector assembly (13) (FIG. 3). The fluid displaced from alignment detector cylinder (60) causes the rod (56) to extend from height adjustment cylinder (55), thereby raising the forward portion of the towed mower.

5 Claims, 2 Drawing Sheets

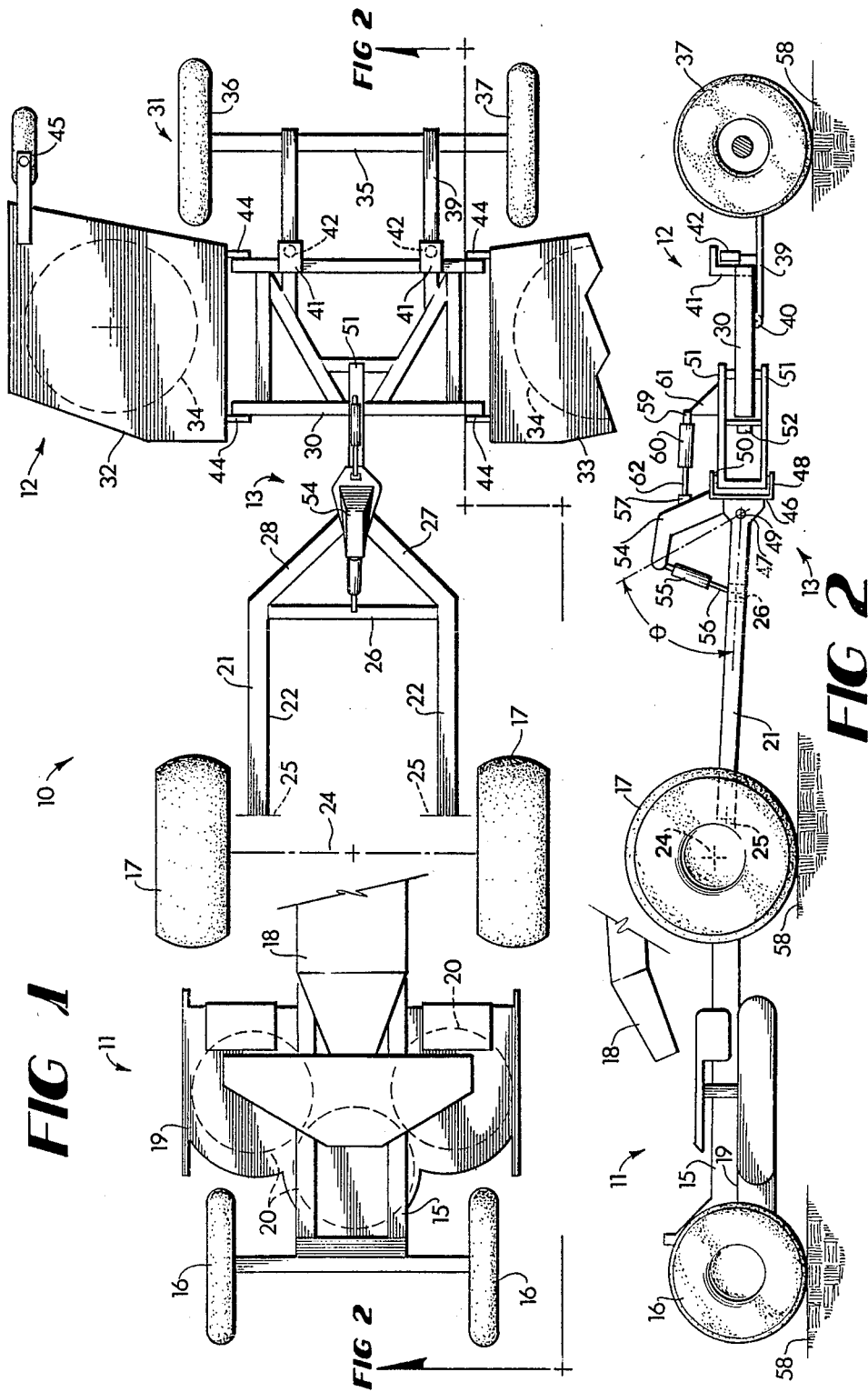

4,876,845

SELF PROPELLED MOWER AND TOWED MOWER WITH ADJUSTABLE HEIGHT CONNECTION

FIELD OF INVENTION

This invention relates generally to a self-propelled powered mower and a towed mower connected to the powered mower to follow in trailer fashion. More particularly, the invention relates to the connector assembly used in combination with the self-propelled power mower and a towed mower, whereby the towed mower is maintained at a proper operating level when the assembly is operated through a turn.

BACKGROUND OF THE INVENTION

During the operation of a towed mower which trails behind a front tractor or mower, it is desirable to maintain the towed mower at a constant operating level so that its cutting mechanism will cut the grass and other foliage at a constant height. When the self-driven powered mower and towed mower are driven along a straight line, the towed mower typically maintains its preset height from the ground surface so that a constant depth cut of the foliage is maintained; however, when the powered mower is turned so that the assembly operates in a curve, the towed mower is angled laterally with respect to the powered mower in trailer fashion. The tendency of the towed mower when operating through a curve is that the front portion of the mower tends to dip closer to the ground surface. This has the effect of shortening the height of the foliage as it is cut by the cutting blades of the towed mower, and in some instances, the front portion of the housing or framework of the towed mower gouges into or scrapes the surface of the earth, causing scalping of the grass, disruption to the mowing operation and possible damage to the mower.

In some instances, the mower operator can anticipate the dipping problem of the towed mower as the operator begins to turn into a curve and the operator can raise the towed mower slightly away from the ground so as to avoid an improper cut or scraping the ground with the towed mower. However, this requires close attention of the operator and certain operator skills that must be developed. Even with an experienced operator, the height adjustment applied to the towed mower when operated in a turn usually is not perfect, resulting in problems such as previously described.

SUMMARY OF THE INVENTION

Briefly described, the present invention comprises a self-propelled powered mower with a connection to a towed mower that automatically adjusts the height of the front portion of the towed mower as the powered mower turns through a curve with the towed mower extending at an angle behind the powered mower. The connector assembly includes a universal joint that permits the towed mower to pivot about a vertical axis with respect to the draw bar that extends rearwardly from the powered mower. The horizontal axis of the universal joint provides a means of changing the draw bar supporting angle and therefore provides a means to level the frame of the towed mower. A turn or angle detector extends between a position forwardly of and another position rearwardly of the vertical pivot of the universal joint and detects the angle made about the vertical pivot at the connector assembly between the draw bar and the towed mower. A height adjuster is mounted at one of its ends to the draw bar and at its other end to the connector assembly, and the height adjuster is responsive to the turn detector so as to raise the front portion of the towed mower away from the ground in response to turning through a shorter radius of turn. This compensates for the normal tendency of the front of the towed mower to dip toward the ground.

In the preferred embodiment of the invention, the turn detector comprises a hydraulic cylinder-piston extending along the longitudinal axis of the powered mower and towed mower when in alignment with one another, with one end of the turn detector cylinder mounted to the towed mower and the other end of the turn detector cylinder mounted to the draw bar, on opposite sides of the vertical pivot pin of the universal joint. With this arrangement, when the powered mower moves through a curved path, the opposite ends of the turn detector cylinder will move closer together, causing fluid to be displaced from the turn detector cylinder. This fluid is directed to a height adjustment cylinder and requires the height adjustment cylinder to extend. The ends of the height adjustment cylinder are connected to the draw bar and to an extension of the connector assembly, and expansion of the height adjustment cylinder raises the connector assembly and the front of the towed mower away from the ground surface.

Thus, it is an object of this invention to provide an improved self-propelled powered mower and towed mower combination which includes an automatic height adjustment system that keeps the front portion of the towed mower from loosing its height during a turn.

Another object of this invention is to provide an automatic height control system for the leading portion of a towed mower, whereby the forward portion of the towed mower is raised as the mowers progress into a turn, so as to compensate for the natural dipping effect usually experienced by the front portion of the towed mower when moving through a turn, thereby maintaining the desired height of the towed mower.

Other objects, features and advantages of the present invention will become apparent upon reading the following specification, when taken in conjunction with the accompanying drawings.

BRIEF DESCRIPTION OF THE DRAWINGS

FIG. 1 a is a plan view, with parts broken away, of the self-propelled powered mower and the towed mower, with the mowers being connected together with the automatic adjustment connector.

FIG. 2 is a partial side view of the powered mower and the towed mower, showing the automatic height adjustment assembly.

DETAILED DESCRIPTION

Figure 3:
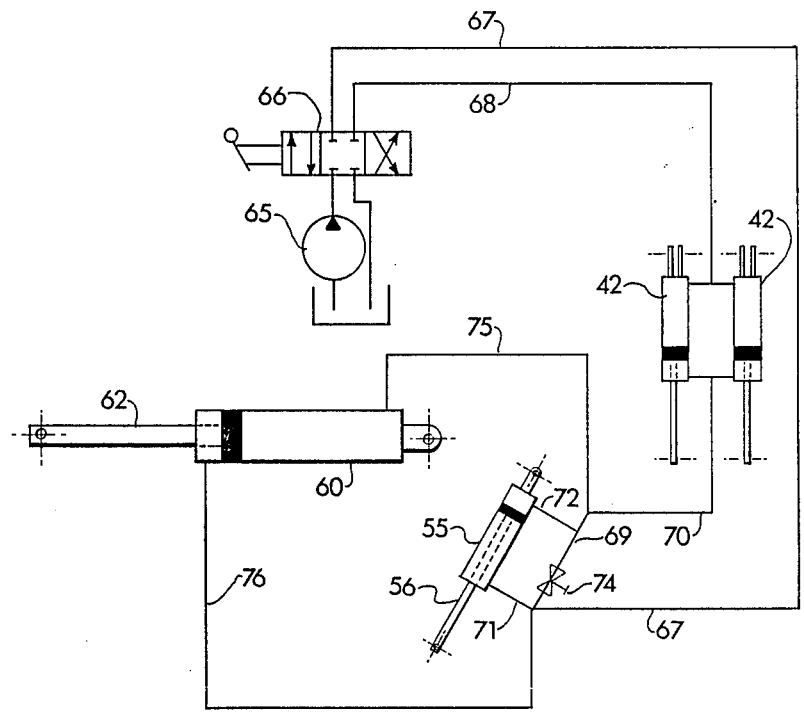
FIG. 3 is a schematic illustration of the fluid flow system of adjustment system.

Referring now in more detail to the drawings, in which like numerals indicate like parts throughout the several views, FIG. 1 illustrates the combination powered mower and towed mower at 10, which more specifically includes the self-propelled powered mower 11, the towed mower 12 and the adjustable height connector assembly 13.

The powered mower 11 includes a framework or chassis 15, front steerable wheels 16, rear driven wheels 17, engine compartment 18 and cutter deck 19. There are three rotary blade cutters 20 beneath cutter deck 19, and an internal combustion engine is located within the engine compartment 18. The engine is operatively connected to the rotary blade cutters beneath the cutter deck 19 and to the rear drive wheels 17.

A U-shaped draw bar 21 is connected at the forward ends of its parallel legs 22 to the framework of the powered mower immediately adjacent the axis of rotation 24 of the driven wheels 17. The legs 22 of the draw bar are pivotably mounted to the framework 15 about a horizontal axis 25, so that the draw bar pivots about the horizontal axis 25. Draw bar 21 further includes laterally extending strut 26 and converging legs 27 and 28.

Towed mower 12 includes framework 30, wheel assembly 31 and wing mowers 32 and 33. Wheel assembly 31 includes axle 35, wheels 36 and 37 mounted to the ends of axle 35, and axle support bars 38 and 39. As illustrated in FIG. 2, axle support bars 38 and 39 are pivotably connected at their forward ends to clevises 40, and a bracket 41 supports a hydraulic cylinder and piston assembly 42 over each axle support bar 38 and 39, with the ends of the cylinder-piston assemblies 42 being connected to the brackets 41 and the respective axle support bars 38, 39. When the cylinder-piston assemblies 42 are extended, the axle support bars 38, 39 will pivot downwardly about the clevises 40, causing the towed mower 12 to be lifted away from the ground surface.

One or more rotary cutting blades 34 are mounted within each wing mower 32 and 33, with the cutting blades 34 being spaced apart a distance that causes them to straddle and intersect the swath cut in the grass beneath the powered mower by rotary cutting blades 20 in the cutter deck of the powered mower 11. The wing mowers 32 and 33 are pivotably connected by hinge connectors 44 to centrally positioned framework 30 so that the wing mowers can tilt up and down during their mowing functions so as to compensate for irregular shapes of the ground surface. Caster wheels 45 are mounted to each wing mower 32 and 33 so as to support the outer portions of each wing mower from the ground surface.

Adjustable height connector assembly 13 is mounted between the trailing or rear end portion of draw bar 21 and the leading or forward end portion of towed mower 12, and comprises a back-to-back, double clevis bracket 46, including a horizontal pin clevis 47 and a vertical pin clevis 48. Horizontal pivot pin 49 connects the draw bar 21 at its rear end to the double clevis bracket. Vertical pivot pin 50 connects the vertical pin device 48 to the longitudinal bracket 51. Longitudinal bracket 51 is connected by longitudinal pivot pin 52 to the framework 30 of the towed mower 12. With this arrangement, a "universal joint" is created, in that horizontal pivot pin 49 permits pivoting between the draw bar 21 and towed mower 12 about a horizontal axis, vertical pivot pin 50 permits pivoting of the draw bar with respect to the towed mower about a vertical axis, and longitudinal pivot pin 52 permits rotational pivoting of the towed mower with respect to the draw bar about a longitudinal axis.

Angled support arm 54 is rigidly mounted at its lower end to double clevis bracket 46, and extends upwardly and forwardly from the double clevis bracket. Height adjustment cylinder 55 is mounted at an angle to the upper distal end portion of the angled support arm 54 and the laterally extending strut 26 of the draw bar 21. When the cylinder rod 56 is progressively extended from cylinder 55, the angle theta between the points of connection of the cylinder 55 and its rod with the angled support arm 54 and the strut 26 increases, causing the rear end portion of the draw bar 21 and the forward portion of the towed mower 12 to be lifted away from the ground surface 58, thus adjusting the height of the forward end portion of the towed mower 12. Conversely, when cylinder 55 and its rod 56 are contracted, the height of the forward end portion of the towed mower 12 will be reduced. Therefore, it will be understood that cylinder 55 functions in combination with angled support bar 54, strut 26 and pivot pin 49 to function as height adjusting means that controls the distance of the front portion of the towed mower from the ground surface.

Figure 4:
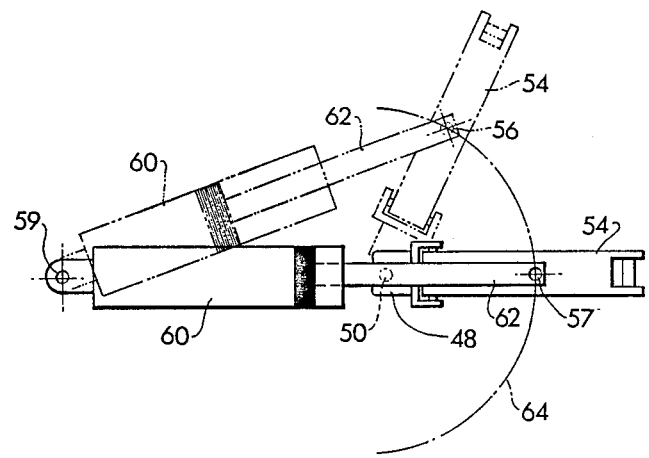
FIG. 4 is a schematic illustration of the turn detector.

Alignment detector cylinder 60 is pivotally mounted to bracket 61 and its piston rod 62 is mounted to angled support arm 54. As illustrated in FIG. 4, the points of connection 57 and 59 of cylinder 60 and its piston rod 62 are on opposite sides of the vertical pivot pin 50 of vertical pin clevis 48. Therefore, when the powered mower 11 moves into a turn as it travels in a forward direction so as to form an angle between the centerline of the draw bar 21 and the centerline of the towed mower 12, the angled support arm 54 turns in unison with the draw bar. This causes the connection point 57 of the piston rod 62 to move in an arc 64 about vertical pivot pin 50. Therefore, the connection point 57 moves closer to the connection point 59, requiring the cylinder 60 and piston rod 62 to retract, causing displacement of the fluid behind the piston within the cylinder 60.

As illustrated in FIG. 3, a pump 65 which is mounted on the powered mower and driven by the engine of the powered mower provides a source of liquid under pressure which is communicated through control valve 66, through conduits 67 and 68. Cylinder/piston assemblies 42 communicate at one end with conduit 68. The cylinder/pistons 42 communicate at their other ends with conduit 67, through bypass conduit 69 and branch circuit 70. Height adjustment cylinder conduits 71 and 72 communicate with height adjustment cylinder 55 at its opposite ends, and a control valve 74 is placed in bypass conduit 69. Conduit 75 communicates with the rear of height adjustment cylinder 55 and with the rear of alignment detector cylinder 60, whereas conduit 76 communicates with the front of alignment detector cylinder 60 and the front of height adjustment cylinder 55.

OPERATION

When in normal operation, the towed mower 12 will be at its lowermost position as adjusted by movable mechanical stops (not shown). The mower is typically used in this configuration on most terrain.

When the towed mower is to be raised so as to clear obstructions, etc., the operator adjusts valve 66 and the rods of cylinders 42 are extended. This causes the axle support bars 38 and 39 (FIGS. 1 and 2) to tilt downwardly about clevices 40, thereby raising the rear portion of the towed mower. In the meantime, as the pistons of cylinders 42 are extended, the fluid at the front of each cylinder 42 is displaced through conduit 70. If adjustment valve 74 is closed, the displaced fluid moves toward the rear of height adjustment cylinder 55, causing that cylinder/piston to extend. This raises the front portion of the towed mower, so that the towed mower is substantially level as it passes over an obstruction, etc.

In the meantime, should the operator move the mower through a turn, the alignment detector cylinder will be contracted by the movement of the pivot point 57 in the arc 64 (FIG. 4). The fluid behind the piston within cylinder 60 will therefore be displaced, causing a fluid flow through conduit 75 from cylinder 60 toward the rear of height adjustment cylinder 55. This causes extension of height adjustment cylinder 55 and its rod 56, causing the front portion of the mower to lift away from the ground surface. This increasing height function caused by the displacement of fluid from the alignment detector cylinder 60 occurs at any position of cylinders 42. That is, the cylinders 42 can be in their retracted or extended positions, or any positions in between, and the alignment detector cylinder 60 and the height adjustment cylinder 55 will function as previously described.

It will be understood that the foregoing relates only to a preferred embodiment of the present invention, and that numerous changes and modifications may be made therein without departing from the spirit and scope of the invention as set forth in the following claims.

I claim:

1. In a mower and a towed mower combination comprising a self propelled powered mower with a framework, rear driving wheels and front wheels mounted to said framework for supporting said powered mower, an engine carried by said framework in driving relationship with said rear driving wheels, at least one cutter supported by said framework and driven by said engine for cutting grass and other vegetation beneath the mower, and a draw bar pivotably mounted about a horizontal axis to and extending from the rear of said powered mower, a towed mower positioned behind said powered mower and including a trailer framework having a front portion and a rear portion, a connector assembly at the front portion of said trailer framework for connecting said trailer framework to said draw bar, wheels mounted to the rear portion of said trailer framework for supporting said towed mower, at least one cutter supported by said trailer framework for cutting grass and other vegetation beneath the towed mower, said connector assembly comprising an approximately vertical pivot pin member permitting said towed mower to trail at an angle with respect to the direction of travel of the draw bar of said powered mower in an approximately horizontal plane behind said powered mower and an approximately horizontal pivot pin member permitting said towed mower to tilt with respect to the draw bar of said powered mower, detecting means mounted to said connector to detect the angle of trail of the towed mower with respect to said draw bar, and responsive means mounted to said connector for raising the front portion of the towed mower in response to a change of the angle of trail of the towed mower with respect to the draw bar.

2. In combination with a self propelled powered mower and a trailing towed mower, said powered mower including driving wheels for propelling said powered mower in a forward direction, and a draw bar connected at one end to said powered mower and extending rearwardly from adjacent said rear driving wheels, a connector assembly connecting together the rear end portion of said draw bar and the forward portion of said towed mower whereby said towed mower is pulled by said draw bar in trailer fashion, said connector assembly including detecting means for detecting the change of angle of trail of the towed mower with respect to said draw bar, and lifting means responsive to the detection of change of the angle of trail for adjusting the height of the forward portion of said towed mower.

3. The combination of claim 1 and herein said connector assembly comprises an upright pivot assembly which permits said draw bar and said towed mower to pivot with respect to each other about a substantially upright axis and a horizontal pivot assembly which permits said draw bar and said towed mower to pivot with respect to each other about a substantially horizontal axis, a first support mounted forwardly of said upright pivot assembly and maintained in alignment with said draw bar and a second support mounted rearwardly of said upright pivot assembly and maintained in alignment with said towed mower, and said detecting means connected between said first and second supports and arranged to detect the change in distance between said first and second supports.

4. The combination of claim 3 and wherein said detecting means comprises a hydraulic cylinder and piston assembly arranged to expel fluid from said cylinder in response to said powered mower turning away from alignment with respect to the towed mower, and wherein said lifting means comprises a first support mounted forwardly of said horizontal pivot and a second support mounted rearwardly of said horizontal pivot, and a second hydraulic cylinder and piston assembly connected between said first and second supports and arranged to receive fluid in response to the expelling of fluid from said first cylinder and change the angle of said draw bar with respect to the forward portion of said towed mower about the substantially horizontal axis of said connector assembly.

5. An adjustable height connector assembly for connection between a self propelled tractor or the like and a towed mower pulled in trailer fashion behind said tractor, said tractor including a draw bar extending rearwardly from and aligned with said tractor, said connector assembly including a bracket with a horizontal pin clevis and a vertical pin clevis, with a horizontal pivot pin pivotally connecting said horizontal pin clevis to said draw bar and a vertical pivot pin pivotally connecting said vertical pin clevis to said towed mower, a height adjustment cylinder operatively connected between said draw bar and said towed mower for raising and lowering the forward portion of said towed mower, a turn detector cylinder operatively connected between said draw bar and said towed mower and arranged to contract when said towed mower moves out of trailing alignment with said draw bar and displace some of its fluid, said height adjustment cylinder being responsive to the displacement of fluid from said turn detector cylinder to adjust the height of the forward portion of said towed mower.

* * * * *

UNITED STATES PATENT AND TRADEMARK OFFICE
CERTIFICATE OF CORRECTION

PATENT NO. : 4,876,845
DATED : October 31, 1989
INVENTOR(S) : James D. Sturgill

It is certified that error appears in the above—identified patent and that said Letters Patent is hereby corrected as shown below:

Column 6, line 11, change "claim 1" to --claim 2--.

Column 6, line 11, change "herein" to --wherein--.

Signed and Sealed this

Second Day of October, 1990

Attest:

HARRY F. MANBECK, JR.

*Attesting Officer*     *Commissioner of Patents and Trademarks*